United States Patent [19]
Bollinger

[11] Patent Number: 5,522,277
[45] Date of Patent: Jun. 4, 1996

[54] ELECTRICALLY-OPERATED LATCH

[75] Inventor: Steven R. Bollinger, Chesterfield, Mo.

[73] Assignee: Carter Automotive Company, Inc., Southfield, Mich.

[21] Appl. No.: 489,526

[22] Filed: Jun. 12, 1995

[51] Int. Cl.⁶ .............................. G05G 5/08; B60K 41/26
[52] U.S. Cl. .......................... 74/531; 192/4 A; 335/276; 335/253
[58] Field of Search ................... 74/531; 188/67; 192/4 A; 70/245, 247, 248; 335/276, 253, 275, 270, 279

[56] References Cited

U.S. PATENT DOCUMENTS

| | | |
|---|---|---|
| 4,887,702 | 12/1989 | Ratke et al. . |
| 4,987,968 | 1/1991 | Martus et al. ............... 192/4 A X |
| 5,076,114 | 12/1991 | Moody ..................... 192/4 A X |
| 5,078,242 | 1/1992 | Ratke et al. ................ 192/4 A |
| 5,176,231 | 1/1993 | Moody et al. . |

Primary Examiner—Charles A. Marmor
Assistant Examiner—Mary Ann Battista
Attorney, Agent, or Firm—Lawrence J. Shurupoff

[57] ABSTRACT

A solenoid-operated latch for a linearly movable shaft such as a shift lever shaft of a vehicle transmission includes an L-shaped armature that forms a latch plate and a magnetic arm. The shaft extends along the solenoid axis and through a clearance hole in the latch plate. Energization of the solenoid draws the magnetic arm toward a planar pole piece at one end of the solenoid winding. The latch plate swings from a position normal to the shaft axis to a tilted condition acutely angled to the shaft axis so that edge areas of the clearance hole grip the shaft surface.

20 Claims, 4 Drawing Sheets

ELECTRICALLY-OPERATED LATCH

BACKGROUND OF THE INVENTION

1. Field of the Invention

The present invention relates in general to an electrically-operated latch, and particularly to an electrically-operated latch for controlling the motion of a linearly movable shaft. The invention is especially adapted for use in automotive brake/transmission safety interlock systems.

2. Description of Prior Developments

U.S. Pat. No. 4,887,702 discloses a brake/transmission safety interlock system for use in automotive vehicles. A manual shift mechanism is connected to a key-operated ignition lock mechanism via a flexible cable. The cable runs through a solenoid that is electrically connected to the vehicle brake system.

A latch device is carried by the cable within the solenoid so that when the solenoid is in a de-energized state the cable is free to move within limits so as to permit manual motion of the shift mechanism out of the "park" position. When the solenoid is in an energized state the cable is prevented from movement in tile direction permitting manual operation of the shift mechanism out of the park position.

The solenoid is electrically connected with the vehicle brake system so that the solenoid is electrically energized only when the brake is actuated, i.e. when the brake pedal is depressed. The solenoid-operated latch therefore serves as an interlock between the brake system and the shift mechanism, such that the manual shifter can be moved out of the park position only when the vehicle is in a braked condition. This promotes vehicle safety.

The solenoid-operated latch disclosed in U.S. Pat. No. 4,887,702 includes a sleeve crimped or otherwise secured to the cable within the solenoid. The sleeve acts as an armature for the solenoid. A tubular pole piece is mounted within the solenoid so that when the solenoid windings are electrically energized the armature sleeve is magnetically drawn toward the tubular pole piece. The magnetic attractive force acts as the latching force to prevent linear motion of the cable in the direction that frees the shifter for movement out of the park position.

When the solenoid windings are de-energized, the armature sleeve is free to move away from the tubular pole piece. The latch device is then in the unlatched condition wherein the cable can be moved to permit manual motion of the shifter out of the park position.

The magnetic latching force is a nonmechanical force that operates axially on the annular end surface of the armature sleeve. The sleeve cross section has to be relatively large to carry the required magnetic flux without exceeding the magnetic saturation limit. The coil has to have a relatively large number of windings, since the latching force is a direct function of the magnetic force.

Another potential drawback with the solenoid-operated latch of U.S. Pat. No. 4,887,702 is that the armature cannot be axially separated from the pole piece by too great a distance, otherwise the magnetic force will be insufficient to attract the armature to the pole piece. Also, the armature sleeve has to be positioned on the cable with some precision, otherwise the armature will not be correctly located in a magnetic sense.

U.S. Pat. No. 5,176,231 discloses an electromagnetic interlock that includes a rod-type shaft having a notch in its side surface. A solenoid is positioned transversely to the shaft so that a linear axial motion of the shaft causes the notch in the shaft to pass through the solenoid axis. The solenoid has a plunger extending from an armature along with solenoid axis in intersecting relation to the shaft axis.

When the solenoid is energized electrically, the plunger is moved into the notch to latch the shaft against linear motion. When the solenoid is de-energized, a coil spring in the solenoid moves the plunger out of the notch thereby freeing the shaft for linear motion.

Movement of the solenoid armature into a bridging position closing the magnetic gap produces a metallic clicking noise that can be disconcerting to some vehicle owners. It would be desirable to have a noise-free, solenoid-operated latch. Moreover, the solenoid has to be precisely located with respect to the notch in the linearly movable shaft. Relatively slight variances in the plunger-notch orientation which occur in normal vehicle production can interfere with proper operation of the latch assembly.

SUMMARY OF THE INVENTION

The present invention is directed to an electrically-operated latch for a movable shaft, wherein a relatively small solenoid can be used for latch-actuation purposes. The latch structure is designed so that there is no physical contact between the latch element and the solenoid pole piece whereby latch operation is essentially noiseless.

The latch structure includes a latch plate extending generally normal to the linearly-movable shaft so that the shaft can move freely through a clearance hole in the latch plate when the solenoid is in the de-energized state. Electrical actuation of the solenoid causes the latch plate to swing or pivot around an axis transverse to the shaft axis. The swinging motion causes selected edge areas bordering the clearance hole to move into engagement with the shaft surface, thereby locking the shaft against linear axial motion. When the solenoid is de-energized, a spring within the solenoid returns the latch plate to its initial position wherein the hole in the plate has clearance with respect to the shaft.

The solenoid-operated latch has an advantageous operational mode in that the solenoid armature has a relatively small operating stroke, whereby a relatively small size solenoid can be used. Also, the mechanism is designed so that the armature need never be in direct physical contact with the associated pole piece. The latch operation is essentially noiseless and provides a significant mechanical advantage via its long lever arm.

It should be noted that the latch plate can come into engagement with the linearly movable shaft at any point along the shaft surface. Latch operation is not dependent on the shaft reaching or attaining a particular location. Therefore the solenoid can be located at various points along the travel path of the shaft without compromising latch operability. A precision location of the solenoid-operated latch is not required. This facilitates assembly of an interlock system.

Further details and advantages of the invention will become apparent from the accompanying drawings and drawing description.

DETAILED DESCRIPTION OF THE PREFERRED EMBODIMENTS

Figure 1:
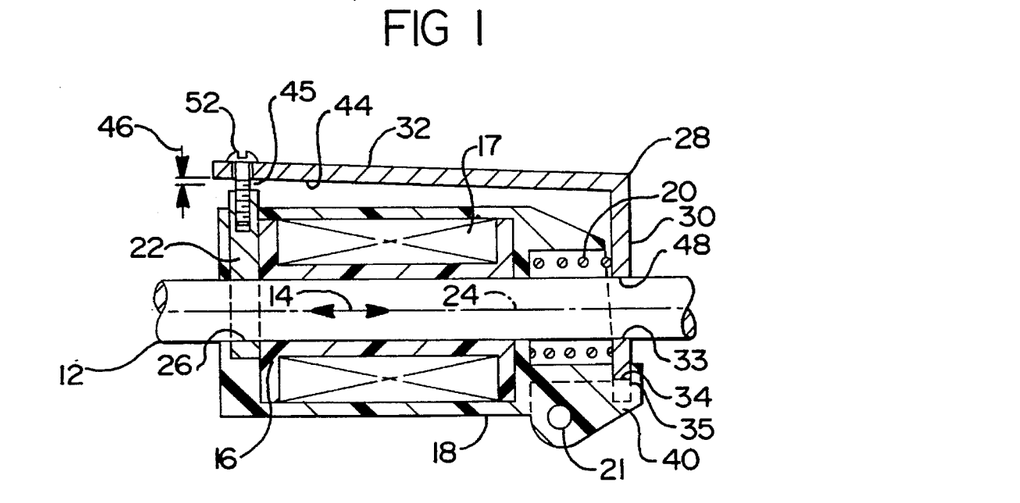
FIG. 1 is a longitudinal sectional view taken through a solenoid-operated latch constructed according to the invention.
Figure 2:
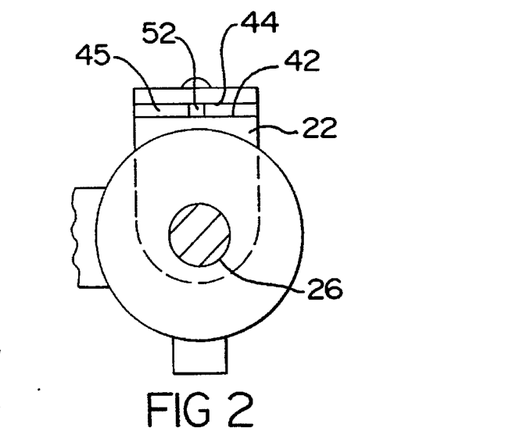
FIG. 2 is a left end view of the FIG. 1 latch construction.
Figure 3:
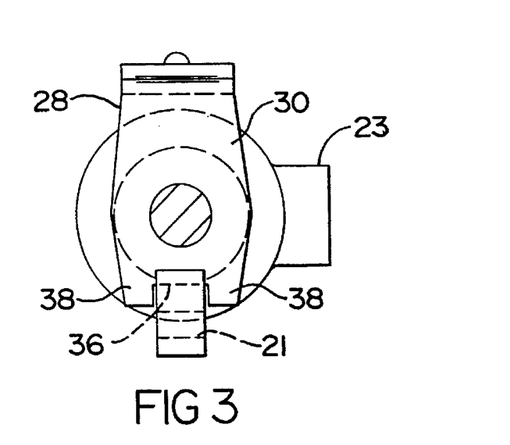
FIG. 3 is a right end view of the FIG. 1 latch construction.

Referring to FIGS. 1 through 3, there is shown a solenoid-operated latch for retaining a linearly movable shaft 12 in selected positions of adjustment. In FIG. 1, the linear motion of the shaft is designated by arrows 14. The shaft moves axially in the direction of the shaft axis.

The solenoid-operated latch includes an electrical winding 17 for generating a magnetic field in a magnetic circuit that includes shaft 12, L-shaped armature 28 and planar pole piece 22. When the winding is energized, the magnetic gap 45 is partially closed by movement of armature arm structure 32 toward pole piece 22 such that latch plate 30 pivots a limited amount around swing axis 34 to cause the edge of hole 33 to grip the surface of shaft 12.

Frictional engagement of the latch hole boundary or edge surface against the shaft surface locks the shaft against motion in the direction of arrow 14. When winding 17 is de-energized, the L-shaped armature 28 is returned to the FIG. 1 position by the biasing action of coil spring 20. The shaft is then free to move in the direction of arrow 14.

Referring to FIG. 14, the solenoid for actuating the latch includes a bobbin 16 having electrical winding 17 wound thereon. After the insulated wire has been wound on the bobbin, the formed coil is encapsulated with a plastic sheath or can structure 18. The plastic sheath is configured to form a cylindrical pocket for containing a coil spring 20, and a mounting hole 21 for the solenoid. The plastic sheath serves to anchor a ferromagnetic pole piece 22 at the left end of bobbin 16. Electrical terminals for windings 17 are located in a boss 23 projecting from the side surface of sheath 18.

As shown in FIG. 1, pole piece 22 includes a flat planar element extending transverse to the solenoid axis. The planar element has a clearance hole 26 slightly larger than the diameter of shaft 12, such that the shaft can move back and forth without interference from the pole piece. However, the edge of clearance hole 26 is in close proximity to the shaft 12 surface, such that magnetic flux can flow between the pole piece and shaft without appreciable magnetic losses. Shaft 12 is formed, at least partly, out of ferromagnetic material whereby the shaft forms part of the magnetic circuit generated by current flow through windings 17.

Planar element 26 includes a wall structure completely encircling shaft 12 via clearance hole 26. However, it is not essential that the pole piece have a complete magnetic connection around the entire shaft surface. The pole piece could have a semi-circular end edge partially encircling the shaft without materially inhibiting the magnetic flux.

The armature for the solenoid includes a single strip of ferromagnetic material 28 bent into an L configuration. The L-shaped strip forms a latch plate 30 extending generally normal to the shaft axis and an elongated arm structure 32 extending along the solenoid side surface to a point adjacent or beyond the pole piece 22.

Latch plate 30 has a circular hole 33 therein having a diameter only marginally greater than the diameter of shaft 12. When the latch plate 30 is positioned normal to the shaft, as shown in FIG. 1, the shaft can move freely through the circular hole 33. The latch plate is mounted for swingable or pivotal movement around an axis 34 (FIG. 1) that extends transverse to solenoid axis 24.

The pivotal mount includes a notch 35 molded into the right end portion of the plastic sheath 18 to receive the lower edge of latch plate 30. As shown best in FIG. 3, the latch plate is cut out (as at 36) to form two ears 38 straddling the rightwardly projecting end portion 40 of the sheath structure. The clearances between ears 38 and projecting portion 40 are relatively small, such that the ears prevent sideways play of the latch plate normal to the plane of the paper in FIG. 1. The latch plate is thus precluded from rubbing against shaft 12 along the side edges of hole 33.

It will be seen from FIG. 2 that planar pole piece 22 has an exposed flat edge 42 extending generally parallel to the flat undersurface 44 of the elongated arm structure 32. The gap between edge 42 and the arm structure undersurface forms a magnetic gap or break 45 in the flux path generated by the electrically-energized winding 17. When the winding is energized, magnetic flux passes through the gap 45 between surfaces 42 and 44 to move arm structure 32 toward pole piece 22.

The magnetic circuit for the solenoid includes shaft 12, latch plate 30, arm structure 32 and pole piece 22. The magnetic flux generated by the solenoid, when energized, causes the armature 28 to rock around axis 34, such that arm structure 32 moves a limited distance toward flat edge 42 of pole piece 22. In FIG. 1, this limited movement is represented by arrows 46. This movement, which is small in magnitude, is sufficient to cause latch plate 30 to grip shaft 12.

The gripping action is great enough to prevent the shaft from moving even when a relatively great axial manual force is applied to the shaft. This is due in part to the significant mechanical advantage provided by arm 32 which generates a large force on shaft 12 by applying a relatively modest force across gap 45.

Figure 6:
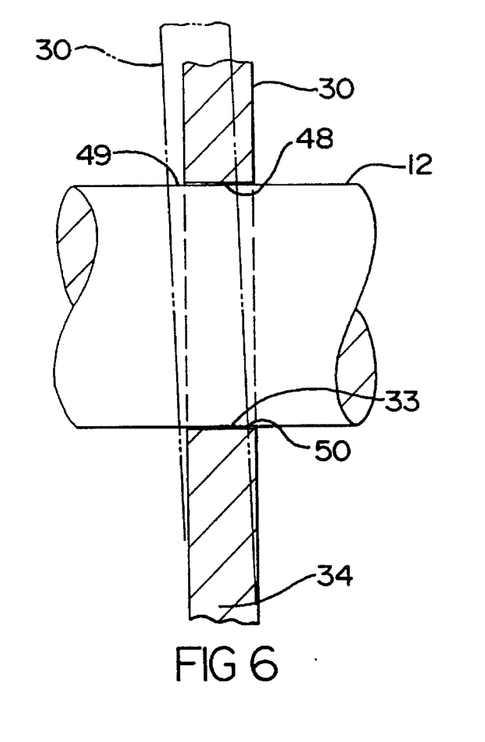
FIG. 6 is a fragmentary enlarged view of a swingable latch plate used in the FIG. 1 and FIG. 4 embodiments Of the invention.

FIG. 6 shows in magnified form the relationship between latch plate 30 and shaft 12. The solid line position of plate 30 corresponds to the de-energized condition of the solenoid while the dashed line position of plate 30 results from energizing the solenoid. In the full or solid line position of plate 30, the edge 48 of hole 33 grips the shaft at the areas designated by numerals 49 and 50, such that the shaft is locked against linear motion.

Figure 7:
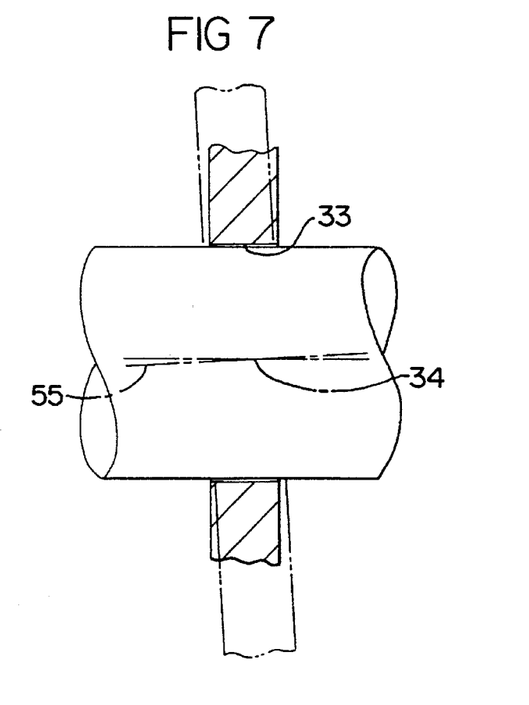
FIG. 7 is a view taken in the same direction as FIG. 6, but showing another latch plate that can be used in the practice of the invention.

FIG. 6 shows the swing axis 34 located below the shaft 12 centerline. However, the swing axis 34 can be located in intersecting relation to the shaft 12 centerline, as depicted in FIG. 7. With the FIG. 7 arrangement, the upper and lower edges of hole 33 are located equidistant from the shaft centerline, so that both edges upper and lower act as shaft gripper surfaces when the winding 17 is energized.

The angular motion of the armature around pivot axis 34 is relatively small, on the order of two degrees. However, the small angular movement is sufficient to enable the latch plate 30 to effectively grip the shaft. Referring to FIG. 1, the small angular movement of the armature around swing axis 34 changes the position of arm structure 32 as indicated by dimension 46. At completion of this movement, the under surface 44 of the arm structure is still preferably spaced from edge 42 of the pole piece. The arm structure need never make physical contract with the pole piece so that the operation is essentially noiseless.

When the solenoid winding is de-energized, armature 28 returns to the FIG. 1 position under the biasing action of coil spring 20. The return movement may be limited by a plastic non flux-conducting stop screw 52 that is threaded into a tapped hole in pole piece 22.. The shank portion of the screw extends through a hole or slot in arm structure 32 smaller than the screw head whereby the head acts as a stop to limit motion of arm structure 32 away from the pole piece.

Stop screw 52 can be turned to adjust the position of the screw head and the arm structure, as may be necessary to ensure that the edge 48 of hole 33 is not in contact with the shaft surface when the solenoid is in a de-energized state. Manual adjustment of the stop screw is used as a calibration procedure to achieve a desired clearance between hole 33 and shaft 12 when the solenoid is de-energized.

Figure 4:
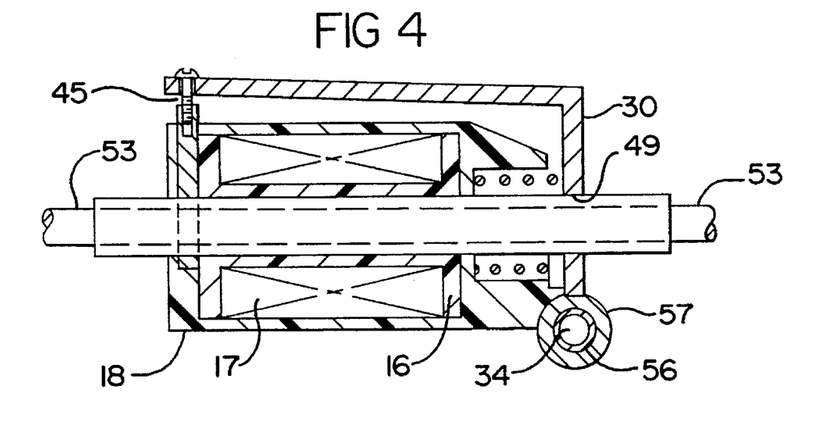
FIG. 4 is a sectional view taken in the same direction as FIG. 1, but showing another embodiment of the invention.
Figure 5:
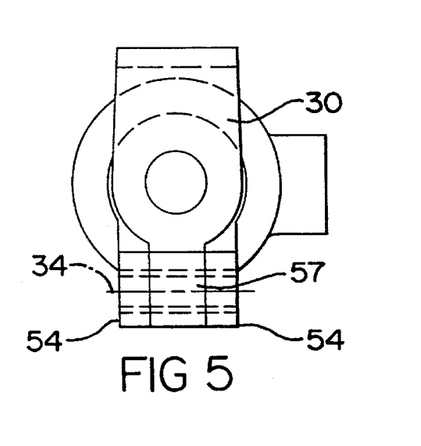
FIG. 5 is a right end view of the latch shown in FIG. 4.

Various types of pivot constructions can be used to mount the armature for swinging motion around the right end portion of the solenoid. FIG. 1 shows a notch 35 for this purpose. FIGS. 4 and 5 show an alternate arrangement including two laterally-spaced lugs 54,54 formed integrally with the sheath structure 18. A sleeve 56 is press fit in openings in lugs 54 to form a cylindrical pivot surface.

Armature 28 is molded or otherwise secured to a collar 57 that encircles sleeve 56 whereby the armature is enable to swing around the axis 34 of the sleeve. Shaft 12 can be formed as an elongated ferromagnetic sleeve anchored on a rod or cable 53. The rod or cable can be magnetic or nonmagnetic in nature since the sleeve constitutes the magnetic conductor for the circuit generated by the solenoid winding.

The operation of the FIG. 4 latch structure is the same as that of the FIG. 1 latch structure. In both cases, the angular L-shape of the armature provides a mechanical advantage that tends to provide a high pressure grip of the latch on the shaft. In this regard, it is noted that the distance between pivot axis 34 and magnetic gap 45 is significantly greater than the distance between pivot axis 34 and the shaft grip point 49 (FIG. 6). The magnetic force thereby acts through a longer lever arm than the latch arm force so that the grip action on the shaft is enhanced.

The hole 33 in the latch plate can have its axis 54 angled slightly to an imaginary plane 55 (FIG. 7) normal to the plane of the plate. With such a slight angulation of the hole axis, the upper and lower edges of the hole will tend to engage flatly on the shaft surfaces when the solenoid is energized so that the area of engagement is somewhat increased. This may tend to improve the locking action, although prototypes constructed with the hole axis exactly normal to the plate plane as in FIG. 6 have been found to be practical and effective.

Figure 8:
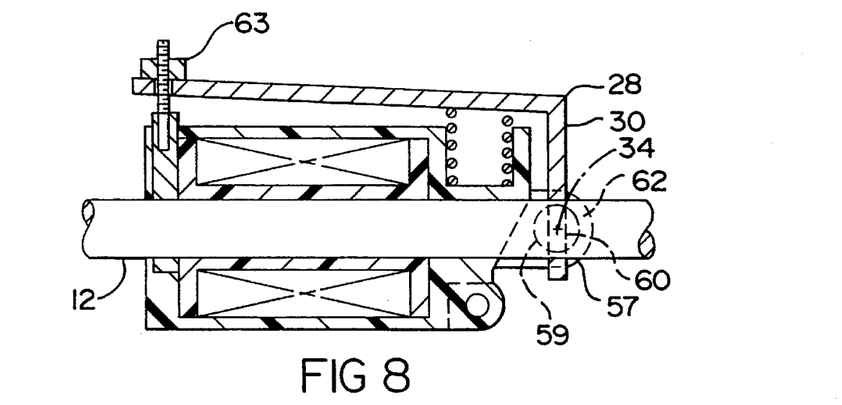
FIG. 8 is a longitudinal sectional view taken through another solenoid-operated latch having the FIG. 7 latch place construction therein.
Figure 9:
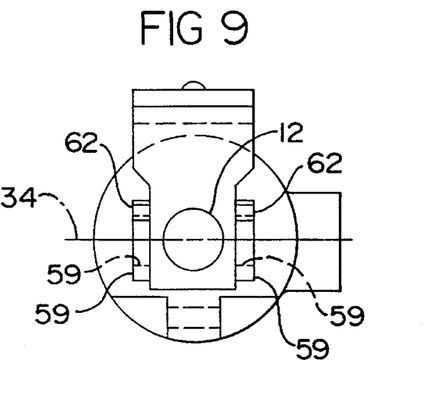
FIG. 9 is a right end view of the FIG. 8 solenoid-operated latch.

FIGS. 8 and 9 show a solenoid-operated latch using the pivot location depicted in FIG. 7. As shown in FIGS. 8 and 9 the plastic sheath structure includes two laterally-spaced lugs 57 having aligned circular holes 59 located on an imaginary transverse axis 34 intersecting the axis of shaft 12.

Figure 10:
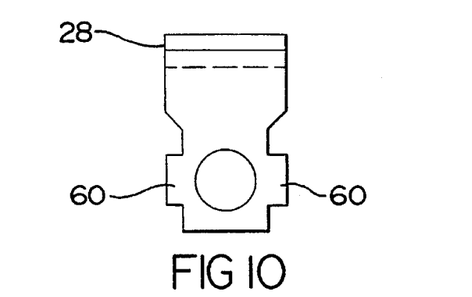
FIG. 10 is a view taken in the same direction as FIG. 9, but showing the latch plate separate from other components.

Armature 28 includes a latch plate 30 having two ears 60 (FIG. 10) extending within the circular holes 59 so that the armature can swing around the hole axis. To facilitate initial installation of the armature on the solenoid, the spaced lugs 57 are formed with radial slots 62 having sufficient width to permit insertion of ears 60 into the circular holes 59.

The solenoid-operated latch of FIGS. 8 and 9 function in essentially the same fashion as the earlier described latches except that the pivot action corresponds to the action shown in FIG. 7.

Figure 11:
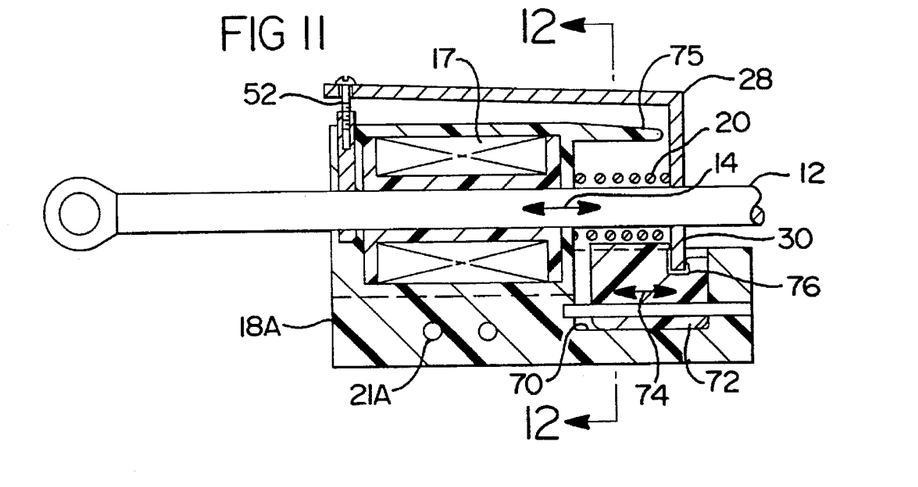
FIG. 11 is a sectional view taken in the same direction as FIG. 1, but showing an additional embodiment of the invention.
Figure 12:
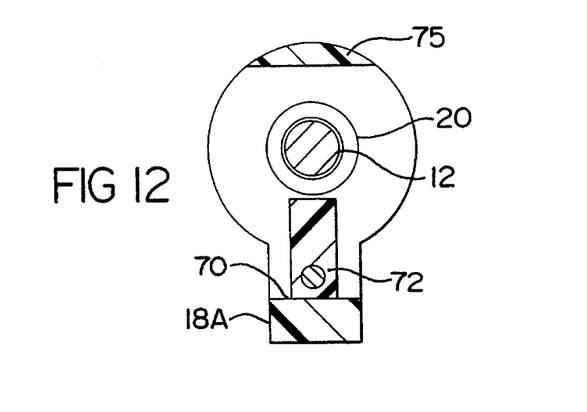
FIG. 12 is a transverse sectional view taken on line 12—12 is FIG. 11.
Figure 13:
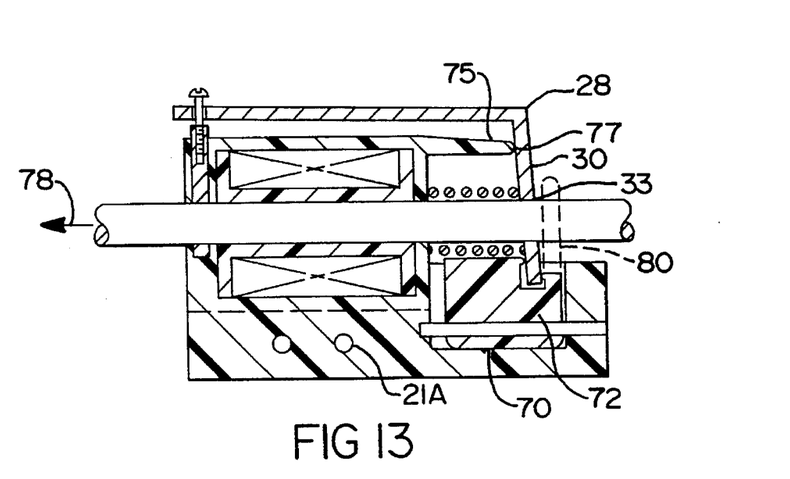
FIG. 13 is a sectional view taken in the same direction as FIG. 11, but showing the mechanism in a latched condition.

FIGS. 11 through 13 show a further form of the invention designed to automatically return the latch plate to the unlatched condition when a significant axial pulling force is exerted on shaft 12. The arrangement of FIGS. 11 through 13 has particular utility as a brake/shift interlock in the environment shown and described in the aforementioned U.S. Pat. No. 4,887,702. In such an environment., the intent is to provide a limited latching force that can be overcome when a significant manual pulling force is applied to the shaft 12 or the cable in the case of a cable-operated system.

The structure depicted in FIGS. 11 through 13 is, in most respects, similar to the structure of FIGS. 1 through 3 except that the pivot mechanism for the L-shaped armature is slidably mounted on the solenoid coil so as to be able to yield when a predetermined axial force is applied to shaft 12. As shown in FIGS. 11 through 1.3, the solenoid sheath structure 18A has two through holes 21A for mounting the solenoid in a fixed position. Also, the solenoid sheath structure is contoured to provide a slideway 70 for an axially movable hinge element 72. The hinge element can move back and forth a limited distance parallel to the solenoid axis, as indicated by arrows 74 in FIG. 11.

Hinge element 72 has a transverse notch 76 therein that serves as a hinge-type mounting for armature 28. The armature can swing around a transverse axis defined by notch 76. Coil spring 20 exerts a rightward bias on the latch plate area of armature 28 so that the armature and hinge element 72 normally assume the FIG. 11 position when winding 17 is de-energized. Shaft 12 can move freely as indicated by arrows 14 in FIG. 11.

When the electrical winding 17 is energized, armature 28 is magnetically biased to the FIG. 13 position wherein selected edge areas of the hole in latch plate 30 grip the shaft surface. The shaft is thus latched against axial movement under normal conditions i.e. relatively light axial loads on the shaft.

The solenoid sheath structure is configured to form an axially-extending abutment 75 in registry with the left face of latch plate 30. In the FIG. 13 condition, the left face of the latch plate is in close proximity to abutment 75. When a significant axial pulling force is exerted on shaft 12, as indicated by arrow 78 in FIG. 13, abutment 75 acts as a fulcrum to permit clockwise motion of armature 28 around the contact point 77 between the armature and the fulcrum. The manual force must be greater than the magnetic force in order for this action to occur.

During this action, the hinge element 72 can slide to the left (from the FIG. 13 position) so that the armature assumes a position wherein latch plate 30 is normal to the shaft axis. When latch plate 30 reaches a position normal to the shaft axis the edges of hole 33 no longer grip the shaft surface. The shaft can then move freely in response to the manual force.

The structure of FIGS. 11 through 13 functions in a similar fashion to the other described embodiments, except that it has the latch release feature due to the slidable hinge 72.

Some structural variations can be employed without affecting the operational mode. For example, the stop element for armature 28 can be a nut 63 threaded onto a threaded pin as shown in FIG. 8, or a stop could be provided on the housing, or as shown in phanton in FIG. 13, in the form of an arm or loop 80 on hinge 72. In this case, stop screw 52 could be eliminated.

One adavantage of the described constructions is that the operation is noise-free, due to the fact that arm structure 32 does not physically strike the pole piece 22. The latch action takes place before such physical contact can occur.

Another advantage of the described construction is that the mechanical force of the latch plate against the shaft is enhanced because the distance between pivot axis 34 and magnetic gap 45 is greater than the distance between axis 34 and the operative latch plate hole surfaces. The armature movement is relatively small as is the actuating force such that a relatively small solenoid can be used.

A further advantage of the described arrangements is that the latch action can take place along any point on the shaft surface. The solenoid-operated latch can be located at any convenient point along the shaft length. Precise positioning of the latch is not required. The latch has utility in vehicle brake/transmission safety interlock systems.

Obviously, numerous modifications and variations of the present invention are possible in the light of the above teachings. It is therefore to be understood that within the scope of the appended claims, the invention may be practiced otherwise than as specifically described herein.

What is claimed is:

1. An electrically-operated latch for a linearly movable shaft, comprising a solenoid mounted around the shaft; an armature movably mounted for motion around an axis transverse to the shaft, said armature comprising a shaft-gripper element having an edge portion; said solenoid being electrically energizable to cause the armature to swing around said axis so that said edge portion exerts a frictional grip on the shaft.

2. The latch of claim 1, wherein said solenoid comprises an electrical winding having an axial end surface and a pole piece disposed transverse to the solenoid axis proximate to said end surface; said armature being spaced from said pole piece so that when the electrical winding is energized said edge portion grips the shaft before said armature can make contact with the pole piece.

3. The latch of claim 2, wherein said pole piece comprises a planar element having a linear edge facing away from the solenoid; said armature comprising a flat arm structure extending from said shaft-gripper element to define a magnetic gap.

4. The latch of claim 3, and further comprising a spring means biasing said armature so as to enlarge the magnetic gap; and stop means limiting the motion of said armature due to the biasing action of said spring means.

5. The latch of claim 4, wherein said stop means is adjustable to control the position of the armature when said solenoid is de-energized.

6. The latch of claim 5, wherein said stop comprises a rotary threaded stop element.

7. The latch of claim 3, wherein said shaft-gripper element and said arm structure are formed from a single strip of ferromagnetic material bent into an angular configuration.

8. The latch of claim 7, wherein said arm structure is angled to said shaft-gripper element at approximately ninety degrees.

9. The latch of claim 3, wherein the shaft is formed out of a ferromagnetic material, whereby said shaft forms a magnetic connection between said pole piece and said shaft-gripper element.

10. The latch of claim 1, and further comprising a hinge means slidably mounted on said solenoid for linear motion parallel to the solenoid axis; said hinge means being swingably connected to said armature whereby said hinge means forms a slidable pivot for the armature.

11. An electrically-operated latch for a linearly movable, transmission shifting shaft, comprising an annular solenoid encircling the shaft; an armature swingably mounted on said solenoid for pivotal motion around an axis transverse to the solenoid axis; said armature comprising a latch plate having a hole therein, whereby said plate extends generally normal to the shaft, with a clearance between the shaft surface and the edge of the hole; said solenoid having a pole piece spaced from the armature so that when the solenoid is energized the armature swings around said transverse axis toward said pole piece such that spacing between the latch plate and the shaft changes thereby causing selected edge areas of the hole to grip the shaft.

12. The latch of claim 11, wherein said pole piece is spaced from said armature so that when the solenoid is energized the hole edge will grip the shaft before the armature can make contact with the pole piece, thereby preventing the noise that such contact would produce.

13. The latch of claim 12, wherein said pole piece comprises a planar element extending transverse to the solenoid axis; said armature comprising a flat arm structure extending angularly from said plate across the plan of said planar element.

14. The latch of claim 13, and further comprising a spring means biasing said armature away from said pole piece and stop means limiting the motion of said armature away from the pole piece whereby said plate is normally oriented to maintain a clearance between the hole and the shaft.

15. The latch of claim 14, wherein said stop means is adjustable for calibration of the position of said plate.

16. The latch of claim 13,, wherein said planar element has an exposed flat edge extending parallel to a major surface of said flat arm structure.

17. The latch of claim 13, wherein said plate and said flat arm structure are integrally formed out of a single strip of ferromagnetic material bent into an angular configuration.

18. The latch of claim 11, wherein the shaft is formed, at least partially, out of a ferromagnetic material whereby said shaft forms a magnetic connection between said pole piece and said plate.

19. The latch of claim 11, wherein said armature has a swingable mounting means slidably mounted on said solenoid whereby, when said latch plate grips the shaft, the swingable mounting means can slide in response to a significant axial pull on the shaft, such that the latch plate can be returned to a clearance position.

20. The latch of claim 11, and further comprising an abutment means carried by said solenoid in registry with said latch plate, such that said abutment means serves as a fulcrum for the latch plate to facilitate slidable motion of said swingable mounting means responsive to a significant axial pulling force on said shaft.

* * * * *

UNITED STATES PATENT AND TRADEMARK OFFICE
CERTIFICATE OF CORRECTION

PATENT NO. : 5,522,277
DATED : June 4, 1996
INVENTOR(S) : Steven R. Bollinger

It is certified that error appears in the above-indentified patent and that said Letters Patent is hereby corrected as shown below:

Title page, item [54] and col.1, line1,

"Electrically-Operated Latch" should read --Electrically-Operated Latch For Locking A Transmission Mechanism--

Column 1, line 22, "tile" should read --the--
Column 1, line 25, "energized" should read --de-energized--
Column 3, line 9, "place" should read --plate--
Column 3, line 18, "is" should read --in--
Column 3, line 46, "14" should read --1--
Column 4, line 1, delete "26"
Column 4, line 59, "full or solid" should read --dashed--
Column 5, line 12, "contract" should read --contact--
Column 5, line 55, delete "54"
Column 6, line 1, "57" should read --54--
Column 6, line 8, "57" should read --54--
Column 6, line 10, "function" should read --functions--
Column 6, line 29, "1.3" should read --13--
Column 7, line 12, "adavantage" should read --advantage--

UNITED STATES PATENT AND TRADEMARK OFFICE
CERTIFICATE OF CORRECTION

PATENT NO. : 5,522,277
DATED : June 4, 1996
INVENTOR(S) : Steven R. Bollinger

It is certified that error appears in the above-indentified patent and that said Letters Patent is hereby corrected as shown below:

Column 7, claim 1, line 37, "solenoid" should read --solenoid having an axis and--

Column 7, claim 6, line 63, "stop" should read --stop means--

Column 8, claim 11, line 14, "solenoid" should read --solenoid having an axis and--

Column 8, claim 11, line 19, "plate" should read --latch plate--

Column 8, claim 11, line 20, "shaft surface" should read --shaft--

Column 8, claim 11, line 21, before 'edge', "the" should read --an--

Column 8, claim 11, lines 25-26, "edge areas" should read --areas of the edge--

Column 8, claim 13, lines 35-36, "plate across the plan of said planar element" should be deleted and replaced with --latch plate--

UNITED STATES PATENT AND TRADEMARK OFFICE
CERTIFICATE OF CORRECTION

PATENT NO. : 5,522,277
DATED : June 4, 1996
INVENTOR(S) : Steven R. Bollinger

It is certified that error appears in the above-indentified patent and that said Letters Patent is hereby corrected as shown below:

Column 8, claim 14, line 40, "plate" should read --latch plate--
Column 8, claim 15, line 43, "plate" should read --latch plate--
Column 8, claim 17, line 47, "plate" should read --latch plate--
Column 8, claim 18, line 53, "plate" should read --latch plate--
Column 8, claim 20, line 60, "11" should read --19--

Signed and Sealed this

Fifteenth Day of October, 1996

Attest:

BRUCE LEHMAN

Attesting Officer    Commissioner of Patents and Trademarks